(12) United States Patent
Aoki et al.

(10) Patent No.: US 10,001,607 B2
(45) Date of Patent: Jun. 19, 2018

(54) OPTICAL WIRING MODULE, OPTICAL TRANSCEIVER, AND OPTICAL COUPLING METHOD

(71) Applicants: FUJITSU LIMITED, Kawasaki-shi, Kanagawa (JP); Photonics Electronics Technology Research Association, Bunkyo-ku, Tokyo (JP)

(72) Inventors: Tsuyoshi Aoki, Machida (JP); Shigeaki Sekiguchi, Zama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days. days.

(21) Appl. No.: 15/643,873

(22) Filed: Jul. 7, 2017

(65) Prior Publication Data

US 2018/0031786 A1 Feb. 1, 2018

(30) Foreign Application Priority Data

Jul. 28, 2016 (JP) ................................ 2016-148819

(51) Int. Cl.
*G02B 6/42* (2006.01)

(52) U.S. Cl.
CPC .......... *G02B 6/423* (2013.01); *G02B 6/4214* (2013.01); *G02B 6/4246* (2013.01); *G02B 6/4249* (2013.01); *G02B 6/4253* (2013.01); *G02B 6/4256* (2013.01)

(58) Field of Classification Search
None
See application file for complete search history.

(56) References Cited

U.S. PATENT DOCUMENTS

2012/0177381 A1  7/2012 Dobbelaere

FOREIGN PATENT DOCUMENTS

JP   2013-243649 A1   12/2013
JP   2016-009160 A1   1/2016

*Primary Examiner* — Jerry Rahll
(74) *Attorney, Agent, or Firm* — Kratz, Quintos & Hanson, LLP

(57) ABSTRACT

An optical wiring module includes an optical wiring substrate on which an optical waveguide having a light input/output part is formed, and a fiber holder mounted on the optical wiring substrate, the fiber holder being configured to hold an optical fiber. The optical wiring substrate includes a hydrophobic film having an opening at a position corresponding to the light input/output part and a first adhesive layer disposed within the opening, and the optical fiber is optically coupled to the light input/output part via the first adhesive layer.

11 Claims, 14 Drawing Sheets

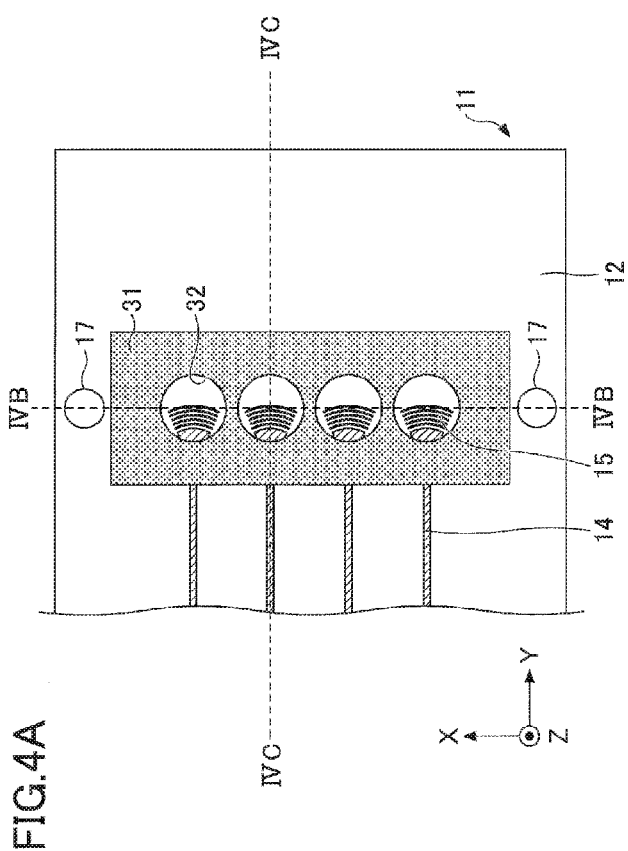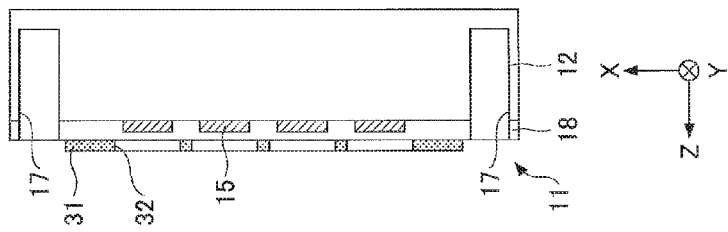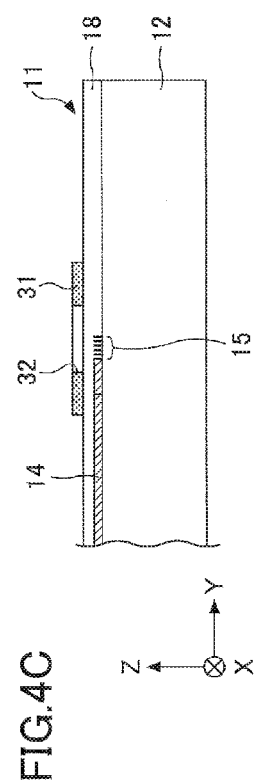

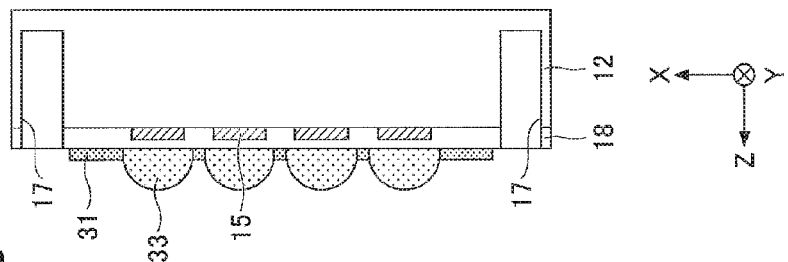
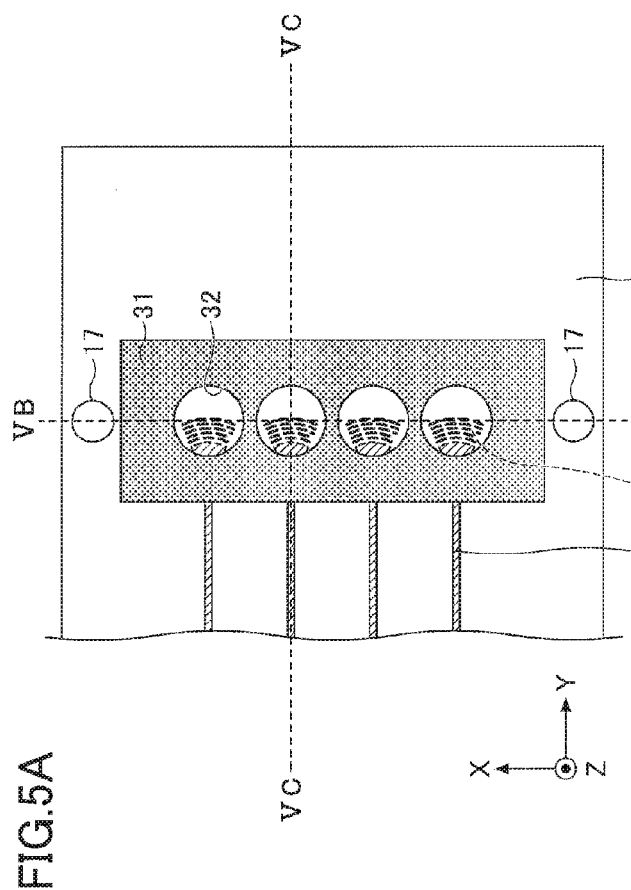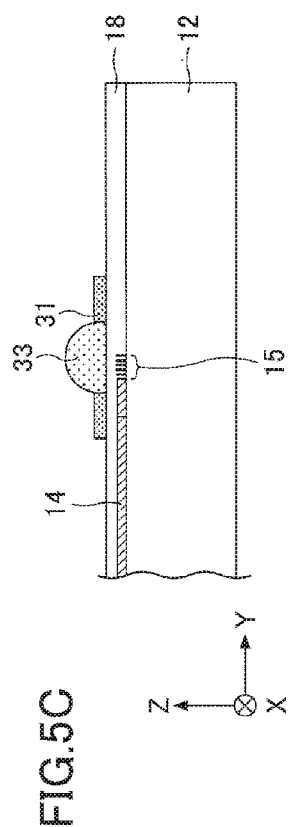

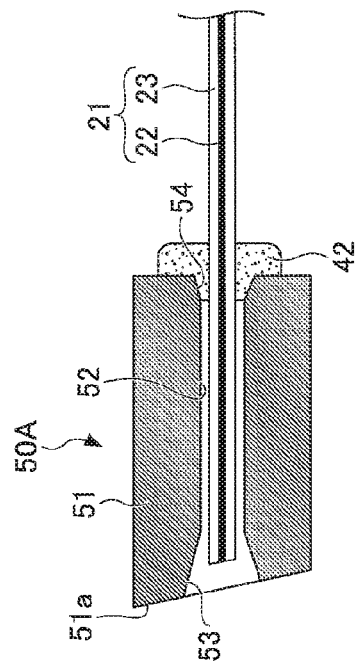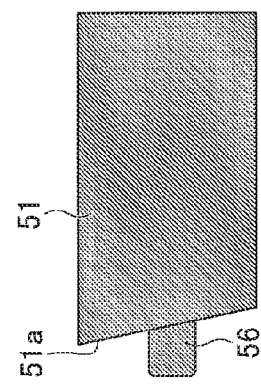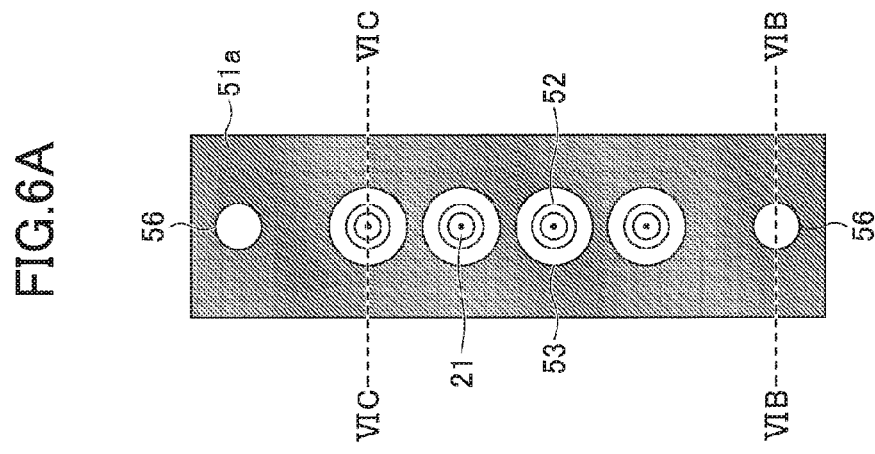

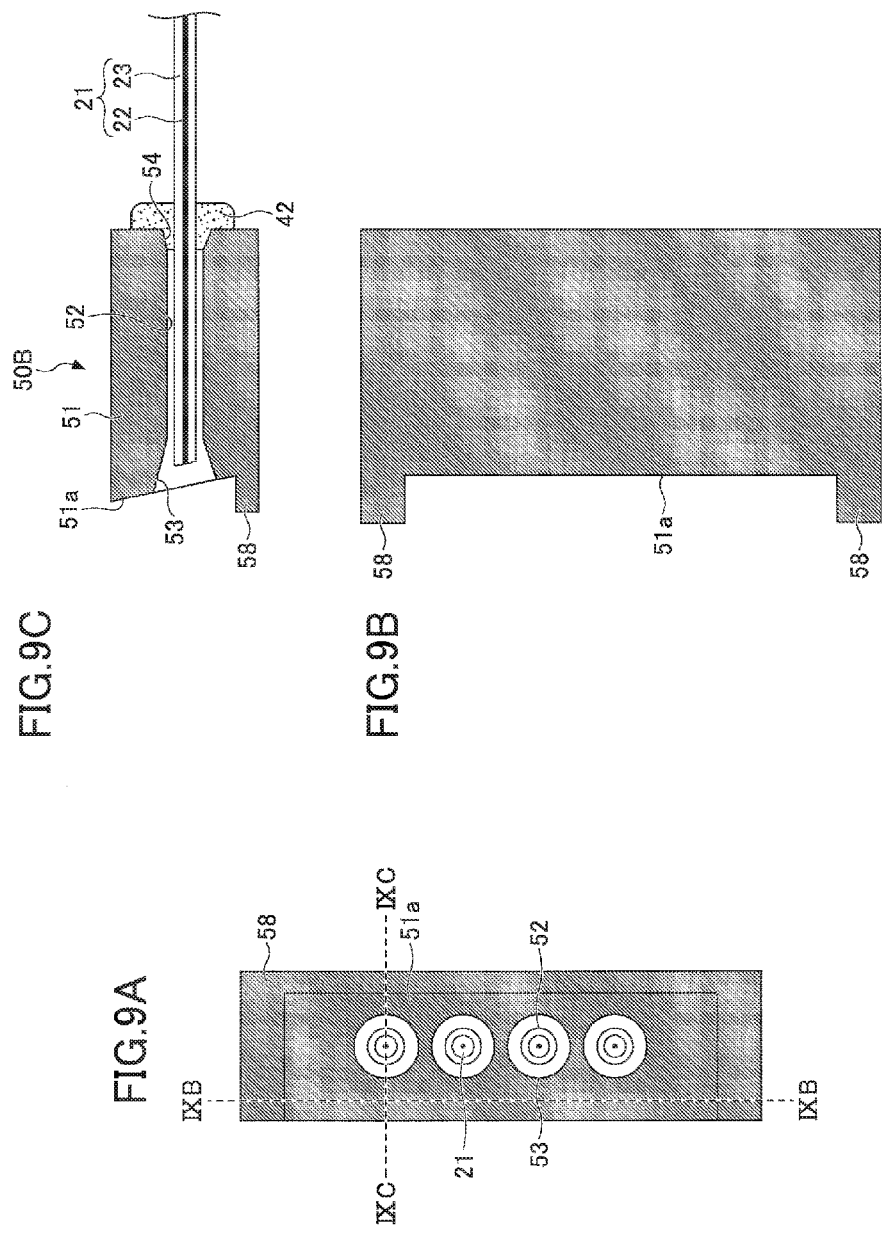

OPTICAL WIRING MODULE, OPTICAL TRANSCEIVER, AND OPTICAL COUPLING METHOD

CROSS-REFERENCE TO RELATED APPLICATION

This patent application is based upon, and claims the benefit of priority of Japanese Patent Application No. 2016-148819 filed on Jul. 28, 2016, the entire contents of which are incorporated herein by reference.

FIELD

The embodiments discussed herein relate to an optical wiring module, an optical transceiver, and an optical coupling method.

BACKGROUND

High-performance computing systems such as supercomputers and server systems adopt high-speed signal transmission, called interconnect, in data communications between large scale integration (LSI) chips. Related art electrical wiring often fail to satisfy transmission with respect to high performance computing systems due to signal waveform degradation caused by channel transmission losses and crosstalk in broadband and/or long distance interconnects. Hence, development and practical application of an optical interconnect configured to convert electric signals into optical signals once to perform communication via optical wiring have been advanced.

In view of reducing the length of electrical wiring, the optical interconnect may preferably have a structure in which an optical transceiver as a minute photoelectric conversion component is disposed in the immediate proximity of the LSI. A silicon photonics technology has been developed for implementing a micro-optical transceiver in a chip form. Silicon photonics is a technology for forming elements each having an optical control function on a silicon substrate by a CMOS process. Examples of the elements with optical control functions include optical modulators, photodetectors, etc., and thin wire waveguides connecting these elements have already been achieved. Several methods for forming an optical interface on a chip have also been developed in order to connect a thin wire waveguide with an optical fiber serving as an external optical wiring.

As an example of the optical interface, a configuration in which a grating coupler fabricated by silicon photonics technology is disposed at the waveguide end is known in the art. An optical fiber serving as an external optical wiring is held substantially perpendicular to the substrate in accordance with a diffraction angle by a fiber holder and optically connected to the grating coupler (e.g., Patent Document 1 and Patent Document 2).

RELATED-ART DOCUMENTS

Patent Documents

Patent Document 1: Japanese Laid-open Patent Publication No. 2013-243649
Patent Document 2: Japanese Laid-open Patent Publication No. 2016-9160

SUMMARY

According to an aspect of an embodiment, an optical wiring module includes an optical wiring substrate on which an optical waveguide having a light input/output part is formed; and a fiber holder mounted on the optical wiring substrate, the fiber holder being configured to hold an optical fiber. The optical wiring substrate includes a hydrophobic film having an opening at a position corresponding to the light input/output part and a first adhesive layer disposed within the opening, and the optical fiber is optically coupled to the light input/output part via the first adhesive layer.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIGS. 4A to 4C are views illustrating a state in which a hydrophobic film is formed on an optical wiring substrate;

FIGS. 5A to 5C are views illustrating a state in which a material of an adhesive layer is dropped into an opening of a hydrophobic film;

FIGS. 6A to 6C are views illustrating a configuration example of a fiber holder;

FIGS. 9A to 9C are views illustrating another configuration example of a fiber holder;

DESCRIPTION OF EMBODIMENTS

In the configuration of the related art optical interface, a fiber holder with high precision is manufactured and used to align and hold the optical fiber on the grating coupler on the substrate. Further, additional process and apparatus are required for adjusting the position and angle with high accuracy while setting, on the substrate, the optical fiber holder substantially perpendicular to the substrate, making the mounting cost of the optical wiring high.

Thus, the following embodiment may be desired to provide an optical coupling technology for optical interconnection which achieves highly accurate optical coupling at a low cost and with a simple structure.

Figure 1:
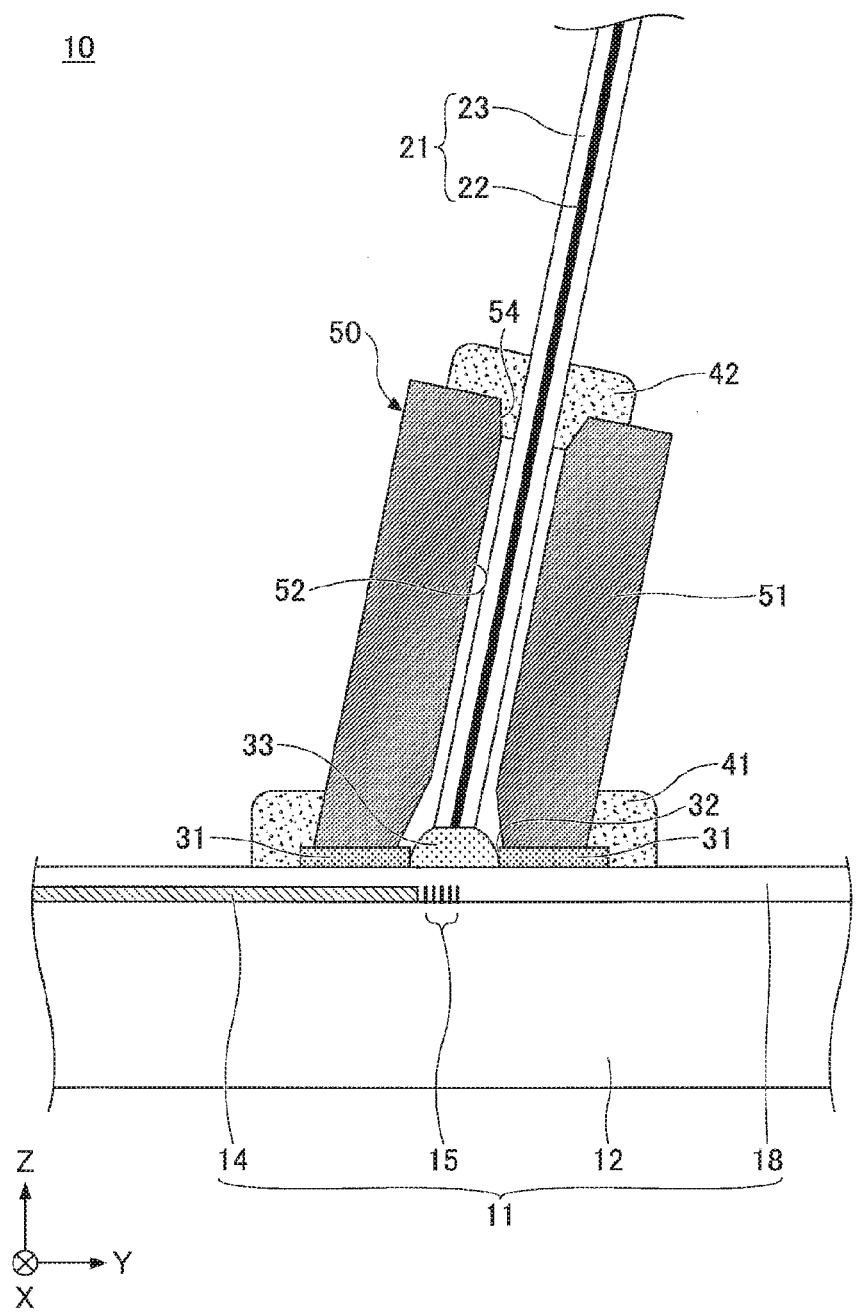
FIG. 1 is a view illustrating a main part of an optical wiring module according to an embodiment.

FIG. 1 is a schematic view of a main part of an optical wiring module 10 according to an embodiment. The optical wiring module 10 includes an optical wiring substrate 11 having an optical waveguide 14 and a grating coupler 15 as a light input/output part, and a fiber holder 50 holding the optical fiber 21 and optically coupling the optical fiber 21 to the grating coupler 15. The grating coupler 15 is configured to input and output light at an angle in a direction perpendicular to or approximately perpendicular to a substrate surface, and serves as an optical interface between the optical waveguide 14 and the optical fiber 21. The optical waveguide 14 and the grating coupler 15 are formed, for example, on a silicon substrate 12 by a silicon photonics technology.

In FIG. 1, a Z direction indicates a direction perpendicular to a main surface of the optical wiring substrate 11 on which the optical waveguide 14 and the grating coupler 15 are formed, a Y direction is an optical axis direction of the optical waveguide 14 within an XY plane orthogonal to the Z direction, and an X direction is a direction orthogonal to the Y axis and the Z axis.

The entire surface of the silicon substrate 12 on which the optical waveguide 14 and the grating coupler 15 are formed is covered with a protective film 18. The protective film 18 is formed of a transparent material such as silicon oxide ($SiO_2$), silicon nitride ($SiN_x$), or the like. The protective film 18 is formed by depositing $SiO_2$ by sputtering or the like and then planarizing the surface by using a CMP (Chemical Mechanical Polishing).

A hydrophobic film 31 is formed in a predetermined region on the protective film 18. The hydrophobic film 31 is formed to cover a region where the grating coupler 15 is formed and has an opening 32 at a position corresponding to the grating coupler 15. The optical fiber 21 is connected to the opening 32 with a hydrophilic adhesive layer 33. The adhesive layer 33 has low light absorption with a material at a wavelength of the optical signal to be used, and is at least transparent to the wavelength used. As will be described later, the adhesive layer 33 enables alignment (self-alignment) of the optical fiber 21 in a self-aligning fashion and fixes a tip of a core 22 of the optical fiber 21 at a coupling position with the grating coupler 15. As a result, the optical fiber 21 is optically coupled to the grating coupler 15 with low loss and high accuracy.

The fiber holder 50 may be fixed to a surface (the protective film 18 in FIG. 1) of the optical wiring substrate 11 with an adhesive 41. The fiber holder 50 has a main body 51 and a fiber guide 52 penetrating the main body 51, and the optical fiber 21 is held at an angle perpendicular to or approximately perpendicular to the optical wiring substrate 11. A diameter of the fiber guide 52 is larger than an outer diameter of a cladding 23 and has a sufficient gap not to interfere with self-alignment of the optical fiber 21 and the grating coupler 15 in the adhesive layer 33. An inner diameter of the fiber guide 52 is, for example, approximately 10 to 15 μm larger than a fiber diameter. When the gap is smaller than 10 μm, a cutting error due to dicing process (normally 10 μm) of the optical wiring substrate 11 may fail to be adequately assembled. When the gap exceeds 15 μm, a movable range of the optical fiber 21 may be too large to stably perform self-alignment.

The optical fiber 21 is fixed with an adhesive 42 in advance at a fiber insertion end 54 of the fiber guide 52. A front end of the optical fiber 21 may move in an in-plane direction inside the fiber guide 52 before curing the adhesive layer 33. FIG. 1 illustrates a state after the adhesive layer 33 is cured, and the optical fiber 21 is fixed to an optimum coupling position with the grating coupler 15 by utilizing restoring force due to surface tension of the adhesive layer 33. Details of the self-alignment of the optical fiber 21 will be described later with reference to FIGS. 8A to 8C.

Figure 2:
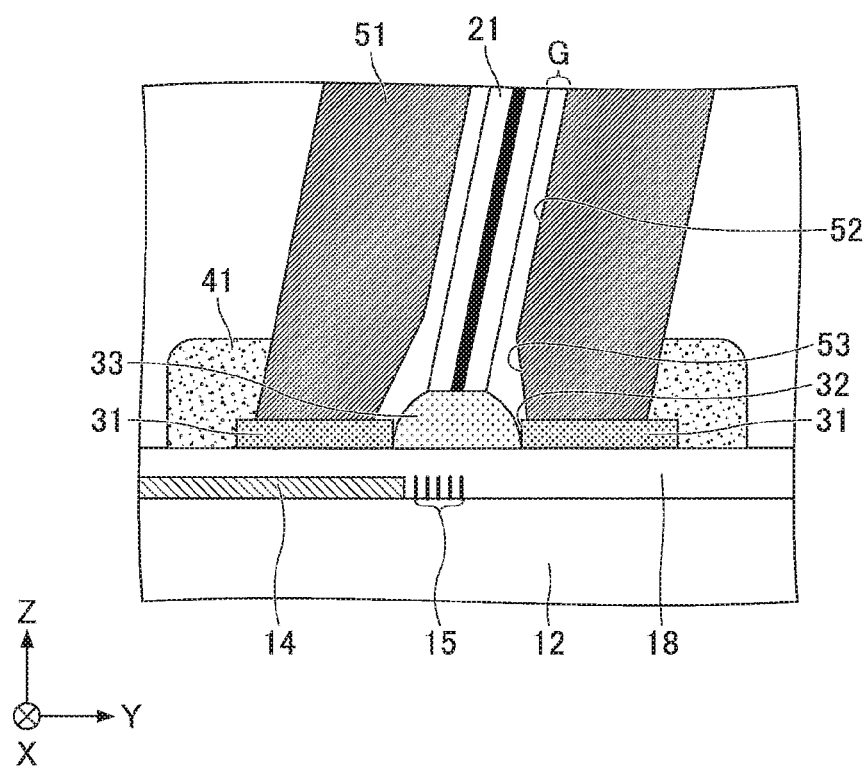
FIG. 2 is an enlarged view of an optical interface portion of FIG. 1.

FIG. 2 is an enlarged view of an optical interface portion of FIG. 1. The adhesive layer 33 having a slightly flat hemispherical shape is disposed within the opening 32 of the hydrophobic film 31. A gap G of approximately 7 to 10 μm is provided between an inner surface of the fiber guide 52 formed in the fiber holder 50 and an outer periphery of the optical fiber 21. The fiber guide 52 has a flared space 53 on a connection surface side opposite to the fiber insertion end 54. The space 53 is provided for accommodating the adhesive layer 33, and a diameter of the space 53 at a bottom surface of the fiber holder 50 is equal to or larger than the opening 32 formed in the hydrophobic film 31.

The optical fiber 21 is optically coupled to the grating coupler 15 by the adhesive layer 33 within the space 53. Incident light from the optical fiber 21 passes through the adhesive layer 33, which is transparent to the wavelength of the signal light, and the protective film 18, is optically coupled to the grating coupler 15, and propagates through the optical waveguide 14. The light emitted from the optical waveguide 14, which is reflected by the grating coupler 15 in a direction perpendicular or approximately perpendicular to the optical wiring substrate 11 and passes through the protective film 18 and the adhesive layer 33, is optically coupled to the core 22 of the optical fiber 21. As will be described later, this optical coupling structure achieves high-precision alignment between the optical fiber 21 and the grating coupler 15 with coarse mounting precision of the fiber holder 50.

Figure 3:
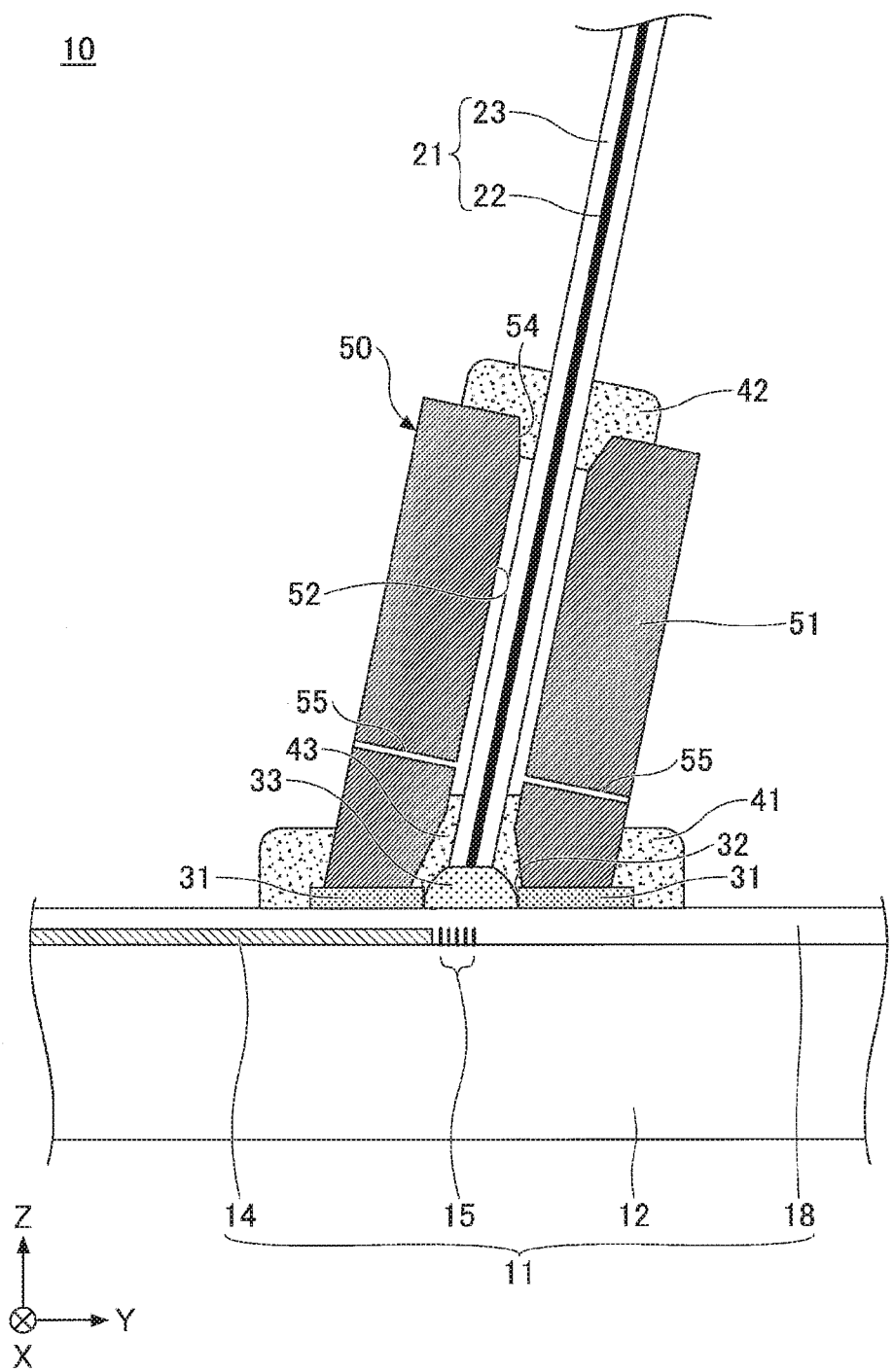
FIG. 3 is a view illustrating a modified configuration of a fiber holder.

As illustrated in FIG. 3, one or more injection channels 55 for injecting adhesive may be provided on a lateral side of the fiber holder 50. After the self-alignment of the optical fiber 21 to the grating coupler 15 is completed, the adhesive 43 may be injected from the injection channel 55 to secure the holding of the optical fiber 21 at the optical coupling position. The injection of the adhesive 43 is performed after the self-alignment has been completed and the adhesive layer 33 has been cured. The cured adhesive 43 will serve as a second adhesive layer for strengthening the bonding between the optical fiber 21 and the adhesive layer 33. This configuration enables the optical fiber 21 to be firmly held at the proper position, thereby improving the reliability of the optical coupling.

FIGS. 4A to 4C are views illustrating the formation of the hydrophobic film 31 on the optical wiring substrate 11. FIG. 4A is a top view, FIG. 4B is a cross-sectional view taken along a line IVB-IVB of FIG. 4A, and FIG. 4C is a sectional view taken along a line IVC-IVC of FIG. 4A.

The hydrophobic film 31 is formed at a position where the fiber holder 50 is to be mounted on a surface of the protective film 18 covering the optical waveguide 14 and the grating coupler 15. The hydrophobic film 31 has an opening 32 at a position corresponding to the grating coupler 15 and exposes the grating coupler 15 within the opening 32. The hydrophobic film 31 is formed of an organic material having a surface coated, for example, with a fluorine-based resin, a composite resin of fluorocarbon and a siloxane, hydrophobic epoxy, hydrophobic urethane, HMDS (hexamethyldisilazane), or the like.

The hydrophobic film 31 having the opening 32 is formed by applying a material of the hydrophobic film 31 to the entire surface of the silicon substrate 12 and patterning the obtained product by exposure and etching by photolithography. The thickness of the hydrophobic film 31 is, for example, 1 to 3 μm. The diameter of the opening 32 is determined according to the diameter of the optical fiber 21.

For example, when a single mode fiber having a diameter of 125 μm is used, the diameter of the opening 32 is approximately 180 to 210 μm, and when a single mode fiber having a diameter of 80 μm is used, the opening 32 having a diameter of 110 to 130 μm is formed.

The shape of the opening 32 is not limited to a circular shape and may be a polygon such as a quadrangle, a hexagon, or an ellipse insofar as the opening is able to accommodate the adhesive layer 33. The protective film 18 exposed via the opening 32 has wettability as compared with the hydrophobic film 31. The degrees of hydrophobicity may vary with the type of material of the hydrophobic film 31; since the protective film 18 exposed via the opening 32 is hydrophilic, the hydrophobicity of the hydrophobic film 31 around the opening 32 will be relatively high. Thus, when the material of the adhesive layer 33 is dropped into the opening 32, the adhesive layer 33 is held in the opening 32.

The optical wiring substrate 11 may have a guide hole 17 to be fitted with the fiber holder 50. In the examples of FIGS. 4A to 4C, the guide holes 17 are formed at opposite ends of the grating coupler 15 in an array direction, and are configured to receive projections formed on the fiber holder 50. The guide hole 17 is formed, for example, by deep etching in the silicon substrate 12. The fiber holder 50 may be mounted, for example, with coarse positional accuracy of approximately 15 μm by fitting the projections of the fiber holder 50 into the guide holes 17. In general, mounting position accuracy of approximately 1 μm in a single mode fiber and approximately 10 μm in a multimode fiber may be required; however, self-alignment is achieved by the adhesive layer 33 in the embodiment, which allows the fiber holder 50 to sufficiently function with mounting accuracy of approximate 15 μm. The self-alignment of the optical fiber 21 with the adhesive layer 33 is performed with the accuracy of photolithography forming the opening 32.

FIGS. 5A to 5C illustrate a state in which the material of the adhesive layer 33 is dropped into the opening 32. The use of a hydrophilic aqueous adhesive as a material for the adhesive layer 33 may provide a hemispherical droplet shape due to the surface tension. The hemispherical droplet shape may be obtained by controlling the dripping amount of the adhesive with a dispenser or the like, thereby implementing the hemispherical droplet shape with high dimensional accuracy. Since the hydrophobic film 31 surrounds the opening 32, the aqueous adhesive remains in the opening 32 while maintaining the surface tension.

When the hydrophobic film 31 is a fluorine-based resin, an adhesive of an organic solvent such as an alcohol type or a ketone type may be used in place of the aqueous adhesive. In this case, the hemispheric adhesive layer 33 is also formed in the opening 32 by surface tension. Any adhesive material may be used insofar as there is a difference in wettability between the adhesive layer 33 and the protective film 18. Note that the adhesive material to be used may have low light absorption at the wavelength of the optical signal to be used, be at least semitransparent, and exhibit the optical loss of the transmission line being within an allowable range.

FIGS. 6A to 6C illustrate a configuration of a fiber holder 50A as an example of the fiber holder 50. The fiber holder 50A is, for example, a 4-core fiber holder in accordance with the arrangement of the grating coupler 15. FIG. 6A illustrates an end face 51a of the fiber holder 50A. FIG. 6B illustrates a cross section taken along a line VIB-VIB of FIG. 6A, and FIG. 6C illustrates a cross section taken along a line VIC-VIC of FIG. 6A.

The optical fiber 21 is housed in a fiber guide 52 formed in a main body 51 of the fiber holder 50A. The covering of 4-core tape fiber is peeled off, the tip of each optical fiber 21 is inserted into the corresponding fiber guide 52, and the tips of the optical fibers 21 are aligned by a jig. The tip position of each optical fiber 21 is slightly retracted from the end face 51a into the space 53 in consideration of the thickness of the adhesive layer 33.

The optical fiber 21 is fixed with an adhesive 42 at a fiber insertion end 54 opposite to the end face 51a. The fiber insertion end 54 is flared to facilitate insertion of the optical fiber 21. Further, when the optical fiber 21 is fixed, a part of the adhesive 42 is taken in the flared fiber insertion end 54 to secure the fixing of the optical fiber 21. In the examples of FIGS. 6A to 6C, the inner diameter of the fiber guide 52 is larger than the outer diameter of the optical fiber 21 by approximately 15 μm. As a result, at the time of self-alignment of the optical fiber 21 and the grating coupler 15, the tip of the optical fiber 21 moves on the adhesive layer 33 in the in-plane direction of the end face 51a with the fixed portion of the adhesive 42 acting as a fulcrum. Note that FIGS. 6A to 6C are not drawn to scale. The movable range of the tip of the optical fiber 21 on the adhesive layer 33 is determined by the length of the optical fiber 21 from the fixed part to the tip, the diameter of the fiber guide 52, the viscosity or elasticity of the adhesive layer 33, and the like. After completion of the self-alignment, each optical fiber 21 is fixed by curing the adhesive layer 33.

As the optical fiber 21, a single mode fiber or a multimode fiber may be used, and a quartz fiber, a plastic fiber or the like may be used. When the fiber holder 50A is mounted at the diffraction angle of the grating coupler 15, the end face of the core 22 is positioned perpendicular to the light emitted from the grating coupler 15 by obliquely cutting the tip of the optical fiber 21 in accordance with the diffraction angle of the grating coupler 15. This determines the position and angle to achieve low loss optical coupling.

A flared space 53 is formed at the end of the fiber guide 52 on the end face 51a side, so that the diameter at the end face 51a is larger. The diameter of the space 53 at the end face 51a is 180 to 220 μm when using a 125 μm fiber, for example, and in the examples of FIGS. 6A to 6C, a 200 μm fiber is used. As described above, the space 53 accommodates a hemispherical adhesive layer 33 when the material of the adhesive layer 33 is dropped into the opening 32 of the hydrophobic film 31. Further, the angle of the optical fiber 21 with respect to the grating coupler 15 may be matched within the space 53.

The fiber holder 50A has a projection 56 on the end face 51a. When the fiber holder 50A is mounted on the optical wiring substrate 11, the projection 56 is inserted into the guide hole 17 (see FIG. 5) formed in the silicon substrate 12 to fix the fiber holder 50A to the optical wiring substrate 11. The projection 56 may be integrally molded by injection molding or the like at the time of manufacturing the main body of the fiber holder 50A.

Figure 7:
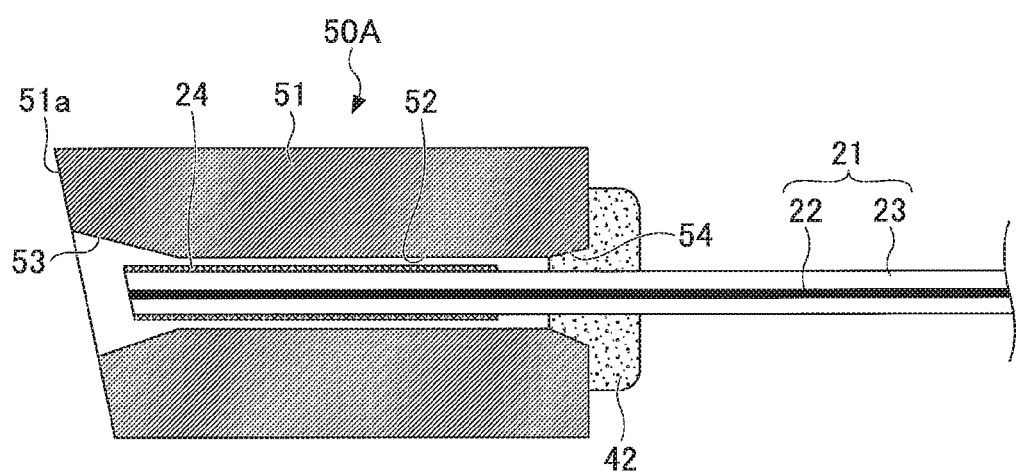
FIG. 7 is a view illustrating a state in which the optical fiber 21 is housed in the fiber holder.

FIG. 7 is a view illustrating a state in which the optical fiber 21 is housed in the fiber holder 50A. In the example of FIG. 7, a part of the outer periphery of the optical fiber 21 is covered with a hydrophobic coating film 24. For example, after peeling off the covering of a tape fiber, a hydrophobic coating film 24 is formed on the optical fiber 21 by spraying in accordance with a spraying method or the like, and then the tip part is obliquely cut to match the diffraction angle by laser processing. The tip position of the optical fiber 21 is slightly retracted from the end face 51a into the space 53 in consideration of the thickness of the adhesive layer 33.

Forming of the hydrophobic coating film 24 on the outer periphery of the tip portion of the optical fiber 21 may facilitate self-alignment on the adhesive layer 33.

Figure 8A:
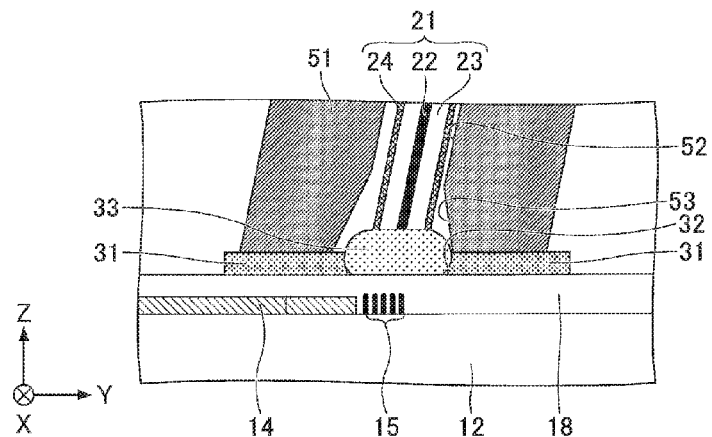
FIGS. 8A to 8C are views illustrating self-alignment behaviors of the optical fiber 21 on the adhesive layer 33.
Figure 8B:
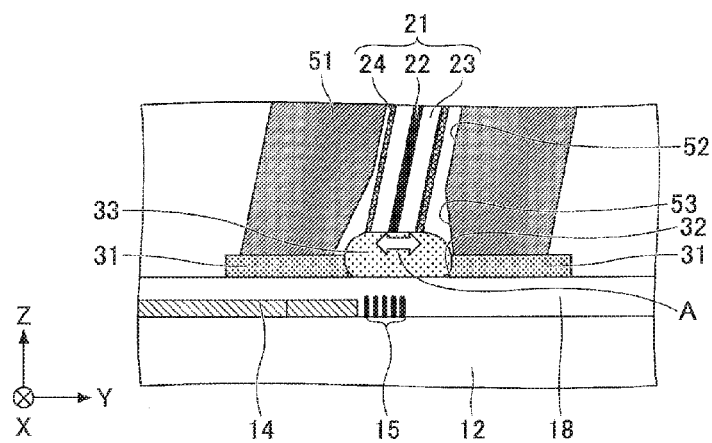
Figure 8C:
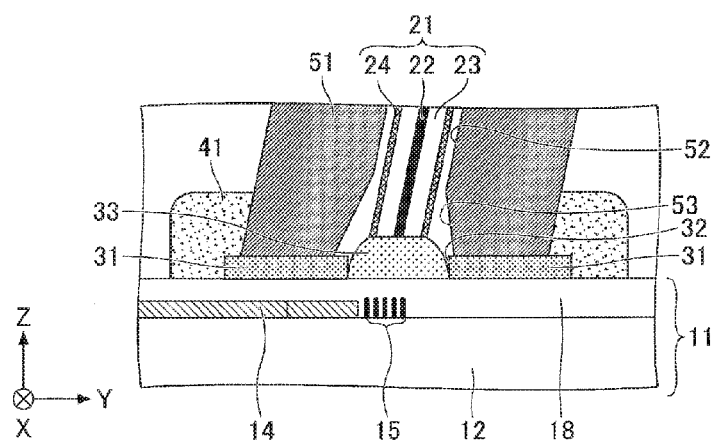

FIGS. 8A to 8C are views illustrating self-alignment behaviors of the optical fiber 21 on the adhesive layer 33. The optical fiber 21 has the configuration of FIG. 7, and a hydrophobic coating film 24 is formed on the outer peripheral surface on the tip end side.

As illustrated in FIG. 8A, when the fiber holder 50 (or 50A) is initially mounted on the optical wiring substrate 11, the tip of the optical fiber 21 may be deviated from a predetermined coupling position as a high degree of precision is not required at this stage. However, as illustrated in FIG. 8B, the end face of the optical fiber 21 may be moved on the surface of the adhesive layer 33 in an in-plane direction by utilizing restoring force due to the surface tension of the hydrophilic adhesive layer 33 and the deflection of the optical fiber 21. The hydrophobic coating film 24 on the outer peripheral surface of the optical fiber 21 also facilitates sliding of the tip of the optical fiber 21 on the adhesive layer 33. The tip of the optical fiber 21 may move on the surface of the adhesive layer 33 in a range of 10 to 15 μm corresponding to a gap (diameter difference) between an inner wall of the fiber guide 52 and an outer periphery of the optical fiber 21.

The end face of the optical fiber 21 is slightly elliptical by an oblique cutting; however, the core 22 is located at the center of the end face of the optical fiber 21. Although the hemispherical shape is pressed and flattened by contact with the end face of the optical fiber 21, the adhesive layer 33 tends to return to the original hemispherical shape due to surface tension. The center of the core 22 and the center of the hemisphere of the adhesive layer 33 are aligned in a self-aligned way due to the weight of the optical fiber 21 and restoring force of the adhesive layer 33. As a result, as illustrated in FIG. 8C, the optical fiber 21 is uniquely aligned to a predetermined coupling position.

Thereafter, the solvent on the adhesive layer 33 is volatilized by heating, and the optical fiber 21 is fixed by curing. Each optical fiber is positioned at an optimum coupling position by self-alignment.

In FIG. 8C, the optical fiber 21 is fixed to the surface of the adhesive layer 33 at its end face by curing the adhesive layer 33. When the fixing of the optical fiber 21 only by the end face is insufficient, the outer peripheral portion of the main body 51 of the fiber holder 50 may be fixed to the optical wiring substrate 11 with the adhesive 41 so as to stabilize the adhesive fixation between the end face of the optical fiber 21 and the adhesive layer 33. Alternatively, as illustrated in FIG. 3, the adhesive 43 may be injected from the injection channel 55 formed in the main body 51 after hardening of the adhesive layer 33 to strengthen adhesion of the optical fiber 21 to the adhesive layer 33.

With the configuration of the embodiment, high precision positioning of the optical fiber by self-alignment may be achieved without using a fiber holder with high dimensional accuracy, a high-accuracy positioning mounting apparatus, or active alignment. In the above example, the grating coupler 15 is used as the light input/output part; however, an example of an optical interface using a mirror formed in the optical waveguide 14 may also be effective. Since light incident on the mirror or light emitted from the mirror is input and output substantially perpendicularly to the substrate surface, the configuration of the embodiment is preferably applied. By using the grating coupler 15 or the mirror formed in the optical waveguide as the light input/output part, it is possible to inspect the optical waveguide 14 using actual light during wafer fabrication.

FIGS. 9A to 9C illustrate a configuration of a fiber holder 50A as another example of the fiber holder 50. FIG. 9A illustrates a structure of an end face 51a of a fiber holder 5B. FIG. 9B illustrates a cross section cut along a line IXB-IXB of FIG. 9A, and FIG. 9C illustrates a cross section cut along a line IXC-IXC of FIG. 9A. When it is difficult to form the guide hole 17 (see FIGS. 4A to 4C and FIGS. 5A to 5C) in the optical wiring substrate 11 as illustrated in FIGS. 6A to 6C, an edge fitting fiber holder 50B as illustrated in FIGS. 9A to 9C may be used.

The main body 51 of the fiber holder 50B has a wall 58 fitted to edges of the optical wiring substrate 11 on three sides of the end face 51a. The wall 58 is integrally molded with the main body 51 of the fiber holder 50B by, for example, an injection molding. The end face 51a and the wall 58 are formed in accordance with the outer shape and size of the optical wiring substrate 11. The optical fiber 21 is housed in a fiber guide 52 formed in a main body 51 of the fiber holder 50B. The tip of the optical fiber 21 is obliquely cut in compliance with the diffraction angle and is positioned slightly retracted inside the space 53 from the end face 51a in consideration of the thickness of the adhesive layer 33.

Figure 10A:
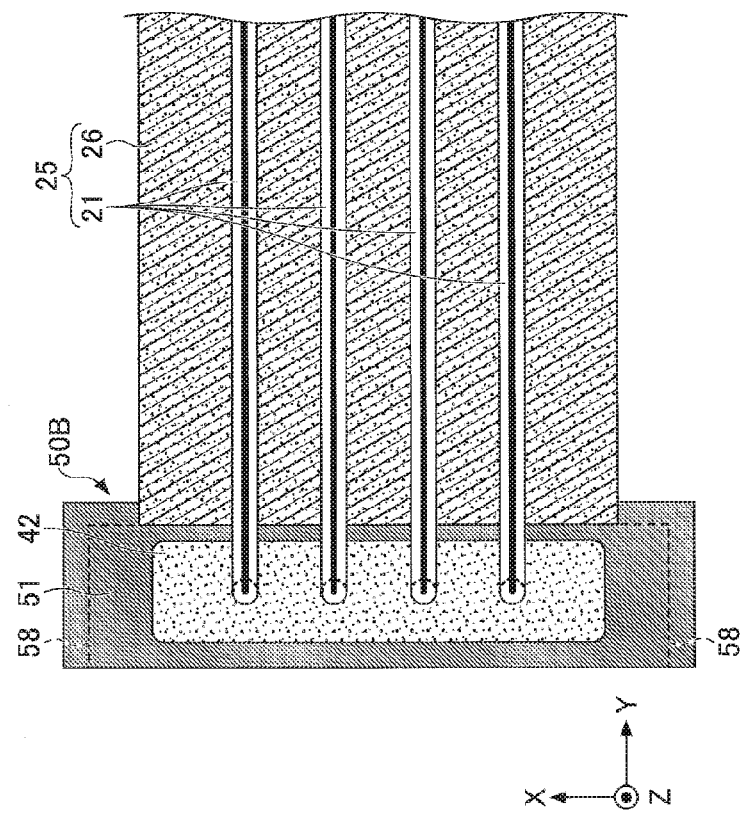
FIGS. 10A and 10B are views depicting the fiber holder of FIGS. 9A to 9C before being mounted.
Figure 10B:
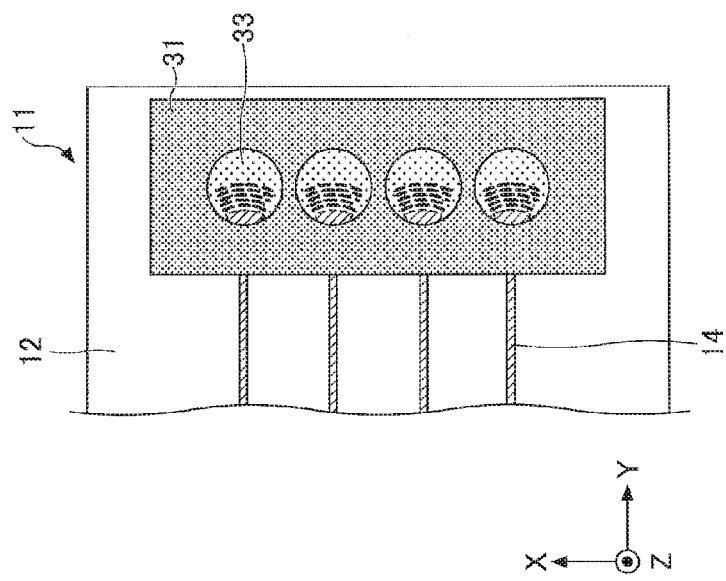
Figure 11:
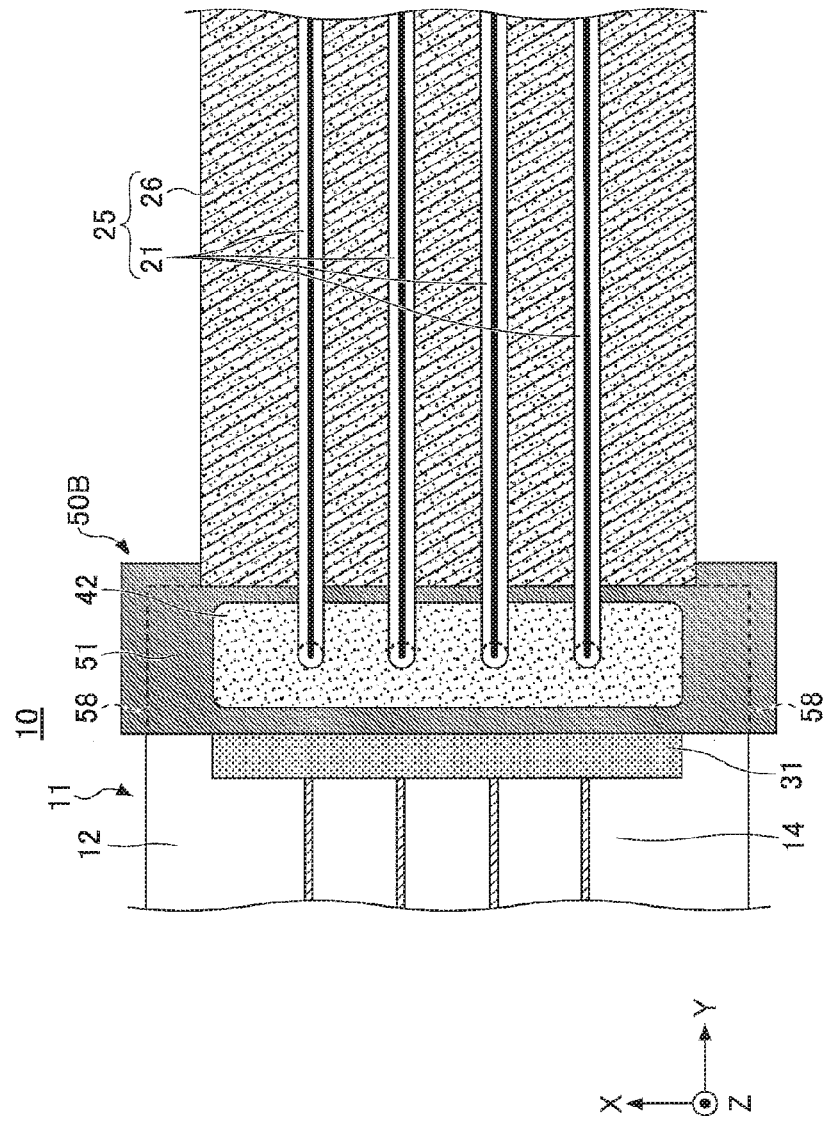
FIG. 11 is a view depicting the fiber holder of FIGS. 9A to 9C after being mounted.

FIGS. 10 A and 10B and FIG. 11 are views illustrating mounting of the fiber holder 50B on the optical wiring substrate 11. FIGS. 10A and 10B illustrate a state before mounting the fiber holder 50B, and FIG. 11 illustrates a state after mounting the fiber holder 50B.

In FIGS. 10A and 10B, the fiber holder 50B on which the optical fiber 21 is mounted is mounted on an edge region of the optical wiring substrate 11. A hydrophobic film 31 and an adhesive layer 33 are formed on the optical wiring substrate 11. A tape fiber 25 is used as an external transmission path connected to the optical waveguide 14 of the optical wiring substrate 11, and the tape fiber 25 includes four optical fibers 21 grouped together by a coating film 26. A part of the coating film 26 is peeled off at the tip end side of the tape fiber 25, and the individual optical fibers 21 are accommodated in the main body 51 of the fiber holder 50B.

In FIG. 11, the wall 58 is fitted to the edges of the optical wiring substrate 11 on the end face 51a of the fiber holder 50B. Because the cutting precision of the optical wiring substrate 11 (chip) by dicing is 10 μm or less, the self-alignment of the optical fiber 21 on the adhesive layer 33 sufficiently functions. The movable range of the tip of the optical fiber 21 on the adhesive layer 33 is 10 to 15 μm in accordance with the gap between the inner wall of the fiber guide 52 and the outer periphery of the optical fiber 21, and variation (variability) in chip size is sufficiently absorbed by self-alignment of the optical fiber 21.

In the examples of FIGS. 9A to 11, the wall 58 is formed on three sides of the end face 51a. However, when the wall is formed on at least two sides of the end face 51a, the fiber holder 50B may be mounted with rough mounting precision by butting. The alignment of the individual optical fibers 21 after mounting of the fiber holder 50B is performed with accuracy of photolithography by self-alignment using the adhesive layer 33.

Figure 12:
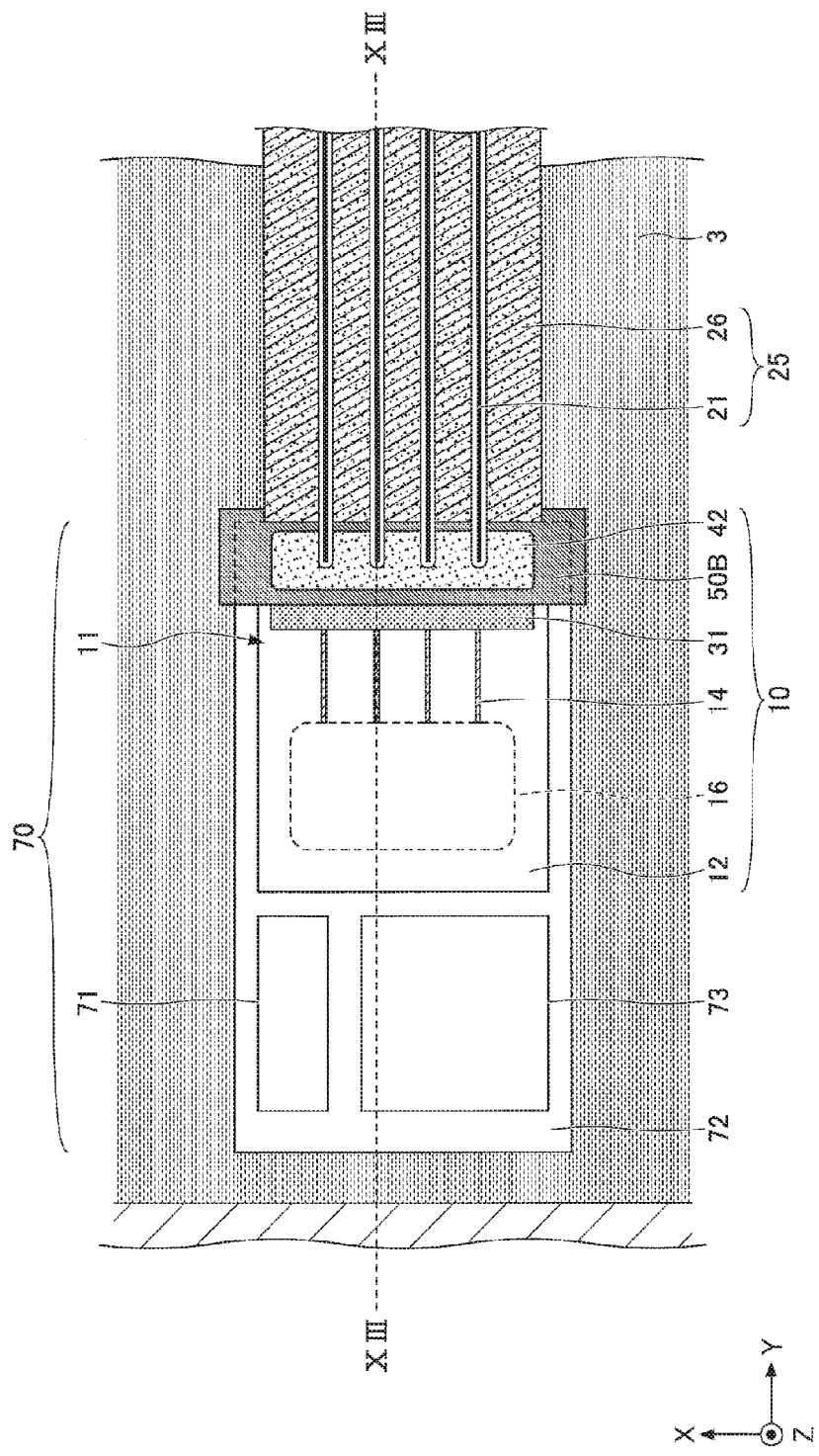
FIG. 12 is a top view illustrating an optical transceiver using the optical wiring module of the embodiment.
Figure 13:
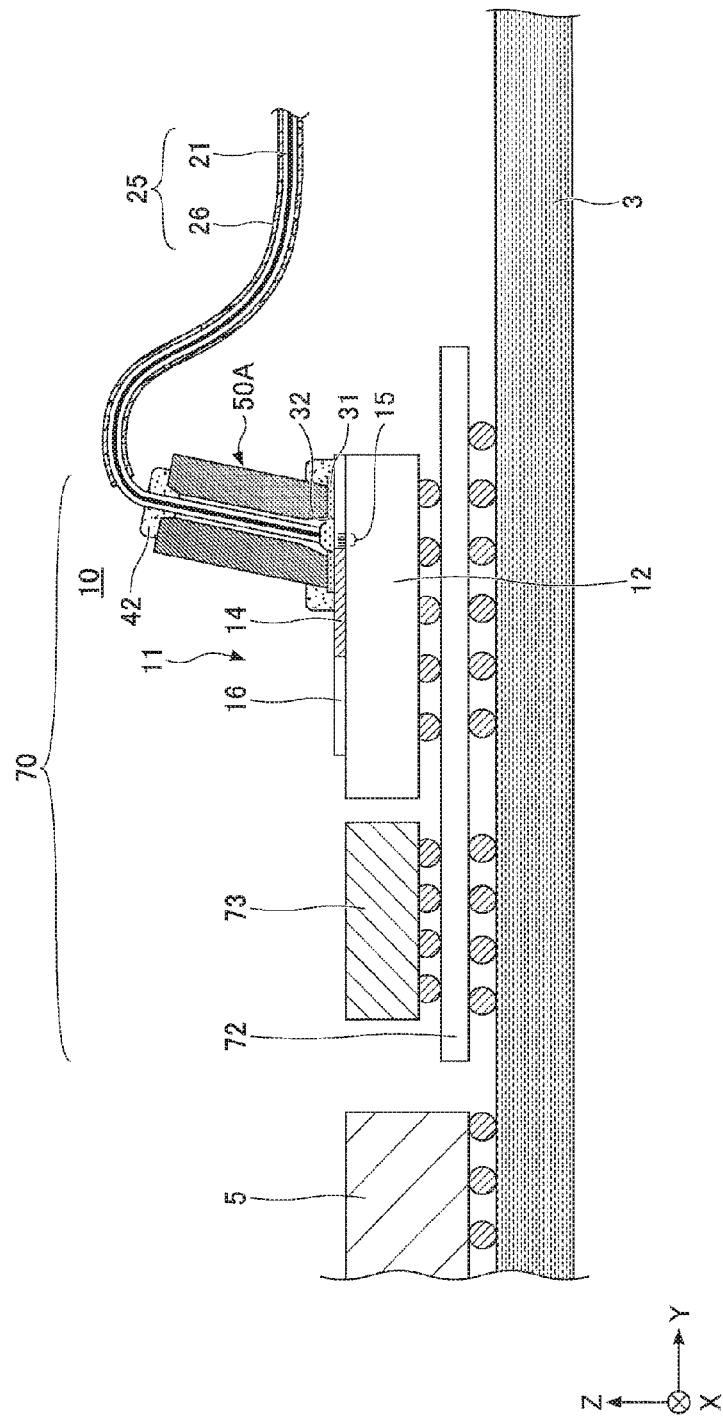
FIG. 13 a side view illustrating the optical transceiver of FIG. 12.

FIG. 12 is a top view of an optical transceiver 70 to which the optical wiring module 10 of the embodiment is applied, and FIG. 13 is a side view of the optical transceiver 70. The optical transceiver 70 has an optical signal transmission/reception function and a photoelectric conversion function.

The optical wiring module 10 used in the optical transceiver 70 has an optical connection with an optical wiring substrate 11 having an optical waveguide 13, a hydrophobic film 31, an optical circuit 16, etc., formed on a silicon substrate 12 within a fiber holder 50 (which may be 50A or 50B). The optical connection is the optical coupling between the optical fiber 21 and the grating coupler 15 by the adhesive layer 33 disposed in the opening 32 of the hydrophobic film 31 as described above.

Optical functional elements such as an optical modulator and a photodetector are formed in the optical circuit 16 on the silicon substrate 12. The optical circuit 16 is mounted on a subpackage substrate 72 from the lower part of the silicon substrate 12 by through-silicon via (TSV), for example. An electric circuit chip 73 including a modulator driver and a transimpedance amplifier is mounted on the subpackage substrate 72 and is electrically coupled to the optical circuit 16 on the optical wiring substrate 11 by solder bumps and TSV. A laser 71 serving as a light source is also mounted on the subpackage substrate 72 and optically coupled to the optical wiring substrate 11.

Figure 14A:
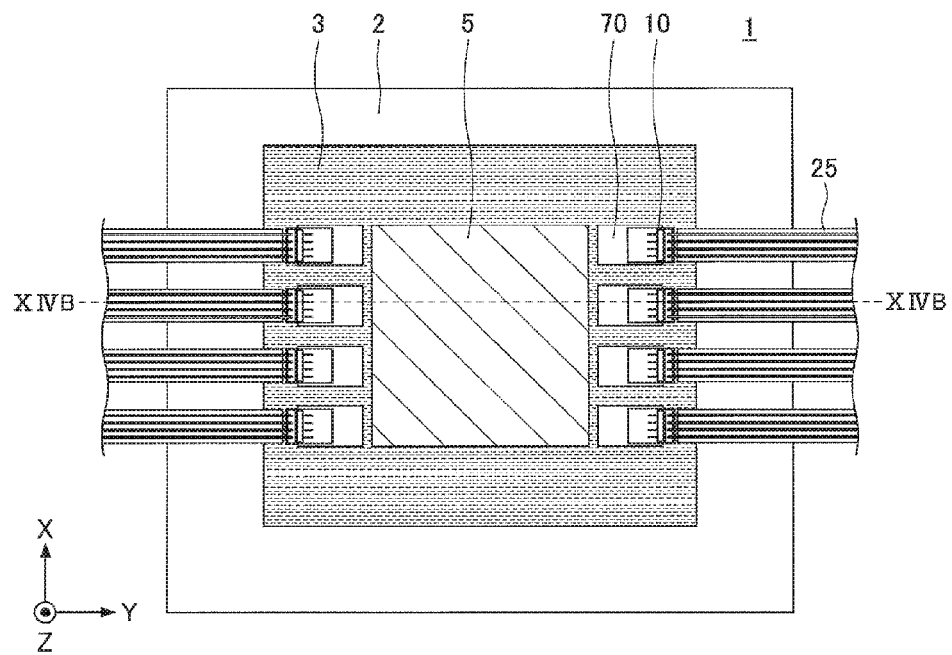
FIGS. 14A and 14B are schematic views illustrating a system substrate as an example of an electronic apparatus to which an optical transceiver is applied.
Figure 14B:
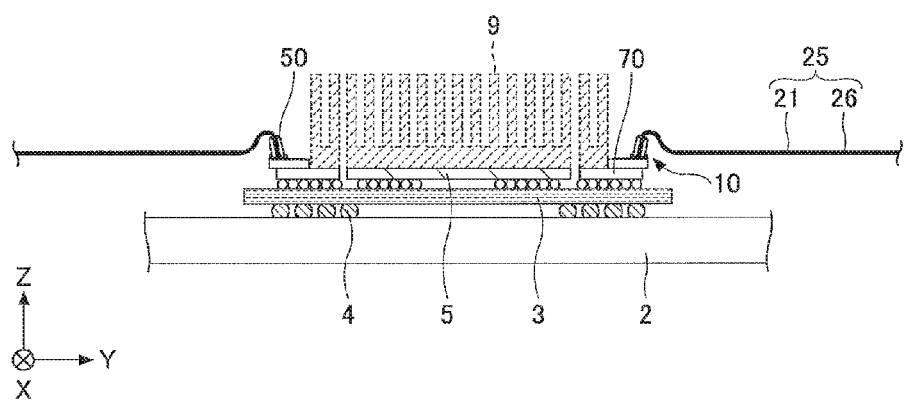

FIGS. 14A and 14B are schematic views of a system substrate 1 as an example of an electronic apparatus in which the optical transceiver 70 is used. FIG. 14A is a top view of the system substrate 1, and FIG. 14B is a cross-sectional view cut along a line XIVB-XIVB of FIG. 14A. The system substrate 1 is used for large-scale computing apparatuses such as supercomputers and servers.

An LSI chip 5 as an electronic component is mounted on a package substrate 3, and multiple optical transceivers 70 are disposed in the proximity of the LSI chip 5. For convenience of illustration, a single package substrate 3 is depicted; however, multiple package substrates 3 may be mounted on the substrate substrate 2 by a ball grid array (BGA) 4.

The electric signal generated by the LSI chip 5 is transmitted to the optical transceiver 70 via the package substrate 3, and is output as a high-speed modulated optical signal by the electric circuit chip 73 and the optical wiring module 10. The optical signal is transmitted to the optical transceiver in the proximity of an LSI mounted on another package substrate, for example, by the optical fiber 21 that will act as external optical wiring. An optical signal received by the optical wiring module 10 from another optical transceiver is converted into an electric signal by the optical wiring substrate 11 and the electric circuit chip 73, and the converted electric signal is transmitted to the LSI chip 5.

A heat sink 9 may be mounted on an upper surface of the electric circuit chip 73 of the LSI chip 5 and the optical transceiver 70 so as to cool the system substrate 1 during its operation. As a cooling device, not only the heat sink 9 but also a cooling plate for water cooling may be used.

As described above, according to the embodiment, the hemispherical adhesive layer 33 is formed with high dimensional accuracy within the hydrophilic region (opening 32) formed in the hydrophobic region on the optical wiring substrate 11. The optical fiber 21 is restrained by the fiber insertion end 54 of the fiber holder 50 (or 50A or 50B), and a gap is provided in the fiber guide 52, such that the tip of the optical fiber 21 may move in the in-plane direction of the end face 51a. Self-alignment between the center of the optical fiber 21 and the center of the adhesive layer 33 is implemented by utilizing the restoring force due to the surface tension of the adhesive layer 33.

According to the configuration described above, it is possible to arrange the end faces of the optical fibers 21 accurately at the coupling position with the grating coupler 15 even with rough mounting precision by fitting the fiber holder 50 and the optical wiring substrate 11. This configuration achieves low cost, high precision, low loss optical connection.

As one aspect of the embodiment, an optical coupling technology for optical wiring that performs high-precision optical coupling at a low cost and with a simple structural configuration may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical wiring module comprising:
   an optical wiring substrate on which an optical waveguide having a light input/output part is formed; and
   a fiber holder mounted on the optical wiring substrate, the fiber holder being configured to hold an optical fiber, wherein
   the optical wiring substrate includes a hydrophobic film having an opening at a position corresponding to the light input/output part and a first adhesive layer disposed within the opening, and
   a tip of the optical fiber is surface-bonded to a surface of the first adhesive layer, and the optical fiber is optically coupled to the light input/output part via the first adhesive layer.

2. The optical wiring module as claimed in claim 1, wherein
   the optical wiring substrate has a hydrophilic surface, and the first adhesive layer is hydrophilic.

3. The optical wiring module as claimed in claim 1, wherein
   the fiber holder includes a fiber guide configured to hold the optical fiber at an angle that is perpendicular to or approximately perpendicular to the optical wiring substrate, and a flared space communicating with the fiber guide on a connection surface side with the optical wiring substrate, wherein the first adhesive layer is accommodated within the flared space.

4. The optical wiring module as claimed in claim 3, further comprising:
   a second adhesive layer disposed within the flared space, the second adhesive layer being configured to fix a connection portion between the optical fiber and the first adhesive layer.

5. The optical wiring module as claimed in claim 4, wherein
   the fiber holder includes an adhesive injection channel that communicates with the fiber guide or the flared space.

6. The optical wiring module as claimed in claim 3, wherein
   the optical fiber is fixed at a fiber insertion end of the fiber holder, and
   a gap is formed between an inner wall of the fiber guide and an outer periphery of the optical fiber.

7. The optical wiring module as claimed in claim 1, wherein at least at a fiber tip portion and a portion close to the fiber tip portion of an outer peripheral surface of the optical fiber is covered with a hydrophobic film.

8. The optical wiring module as claimed in claim 1, wherein
the fiber holder includes a projection or a wall to be fitted to the optical wiring substrate.

9. An optical transceiver comprising:
the optical wiring module as claimed in claim 1; and
an electric component connected to the optical wiring module.

10. An electronic apparatus comprising:
an electronic component; and
the optical transceiver as claimed in claim 9, wherein the optical transceiver is disposed on a package substrate in the vicinity of the electronic component.

11. An optical coupling method comprising:
forming a hydrophobic film on a substrate on which an optical waveguide having a light input/output part is formed, the hydrophobic film having an opening at a position corresponding to the light input/output part; and
disposing an adhesive layer within the opening; and
bringing a tip end face of an optical fiber held with a predetermined gap in a fiber guide into contact with the adhesive layer so as to self-align a core of the optical fiber and the light input/output part using surface tension of the adhesive layer.

* * * * *